United States Patent
Sood (10) Patent No.: US 11,966,276 B2
(45) Date of Patent: Apr. 23, 2024

(54) ERROR TESTING FOR COMPUTERS USING TEMPORARY, SELF-TERMINATING FAULT INJECTORS

(71) Applicant: Microsoft Technology Licensing, LLC, Redmond, WA (US)

(72) Inventor: Sushant Sood, Marysville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/750,606

(22) Filed: May 23, 2022

(65) Prior Publication Data
US 2023/0409418 A1 Dec. 21, 2023

(51) Int. Cl.
| G06F 11/00 | (2006.01) |
| G06F 11/07 | (2006.01) |
| G06F 11/22 | (2006.01) |
| G06F 11/36 | (2006.01) |
| G06F 9/445 | (2018.01) |

(52) U.S. Cl.
CPC ...... *G06F 11/0709* (2013.01); *G06F 11/0754* (2013.01); *G06F 11/2273* (2013.01); *G06F 11/3644* (2013.01); *G06F 11/3688* (2013.01); *G06F 11/3696* (2013.01); *G06F 9/44568* (2013.01)

(58) Field of Classification Search
CPC ............. G06F 11/2273; G06F 11/3644; G06F 11/3688; G06F 11/3696; G06F 9/445; G06F 9/44568; G06F 9/44584
See application file for complete search history.

(56) References Cited

U.S. PATENT DOCUMENTS

| 6,477,666 B1 | 11/2002 | Sanchez et al. |
| 6,484,276 B1 | 11/2002 | Singh et al. |
| 7,467,333 B2 | 12/2008 | Keeton et al. |
| 7,757,215 B1 | 7/2010 | Zhou et al. |
| 10,346,612 B1 | 7/2019 | Donovan et al. |
| 10,986,013 B1 | 4/2021 | Theimer et al. |
| 11,080,157 B1 | 8/2021 | Roberts |
| 11,307,948 B2* | 4/2022 | Guan ................... G06F 11/3688 |
| 11,467,945 B1* | 10/2022 | Cao ...................... G06F 11/3664 |
| 2017/0024299 A1* | 1/2017 | Deng .................. G06F 11/3414 |
| 2017/0032694 A1 | 2/2017 | Brueckner et al. |
| 2020/0250074 A1* | 8/2020 | Zhang ................. G06F 11/3664 |

(Continued)

OTHER PUBLICATIONS

Camacho, Carlos et al., Chaos as a Software Product Line—A platform for improving open hybrid-cloud systems resiliency, Jan. 18, 2022, Wiley Online Library (Year: 2022).*

(Continued)

*Primary Examiner* — Marc Duncan
(74) *Attorney, Agent, or Firm* — Holzer Patel Drennan (57) ABSTRACT

Methodologies for testing resiliency of server computer environments with greater security are disclosed. Access is provided to a subset of server computer resources to a client user within a distributed server computer platform to form the server computer environment. An ephemeral fault injector program is instantiated to implement a resiliency experiment within server computer environment. The ephemeral fault injector program is configured to self-terminate within the server computer environment upon completion of the resiliency experiment.

21 Claims, 4 Drawing Sheets

(56) References Cited

U.S. PATENT DOCUMENTS

2022/0100645 A1  3/2022  Paterson-jones et al.

OTHER PUBLICATIONS

Siwach, Gautam et al., Evaluating operational readiness using chaos engineering simulations on Kubernetes architecture in Big Data, 2022, IEEE (Year: 2022).*

De, Suman, A Study on Chaos Engineering for improving Cloud Software Quality and Reliability, 2021, IEEE (Year: 2021).*

Carlsson, Johan, "Failure Injection For AWS Lambda Azure Functions", Retrieved from: https://opsiocloud.com/resource/blog/failure-injection-for-aws-lambda-azure-functions/, Mar. 18, 2020, 7 Pages.

Riggins, Jennifer, "Breaking Serverless on Purpose with Chaos Engineering", Retrieved from: https://thenewstack.io/breaking-serverless-on-purpose-with-chaos-engineering/, Oct. 14, 2020, 4 Pages.

"International Search Report and Written Opinion Issued in PCT Application No. PCT/US23/012975", dated May 25, 2023, 10 Pages.

* cited by examiner

ERROR TESTING FOR COMPUTERS USING TEMPORARY, SELF-TERMINATING FAULT INJECTORS

BACKGROUND

Computer systems, and often server computer systems, are typically equipped with Error Correction Code (ECC) memory that can automatically correct certain types of memory errors. For example, some computer hardware architectures, (e.g., Microsoft Windows Hardware Error Architecture (WHEA)) support Predictive Failure Analysis (PFA) for ECC memory. In systems that have ECC memory, by using PFA, the computer hardware can monitor one or more ECC memory pages that have encountered previous errors. Information about the corrected errors and their frequency is available to the operating system and can be used to predict impending failures, including uncorrectable failures that can be catastrophic and lead to unplanned downtime. If the number of errors exceeds a configurable threshold for the same memory page within a configurable time interval, the hardware architecture may attempt to take the memory page offline before a serious failure occurs.

SUMMARY

In an example implementation, a resiliency testing method is disclosed. Access is provided to a subset of server computer resources to a client user within a distributed server computer platform to form a server computer environment. An ephemeral fault injector program is instantiated to implement a resiliency experiment within server computer environment. The ephemeral fault injector program is configured to self-terminate within the server computer environment upon completion of the resiliency experiment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations and from the example illustrations in the accompanying drawings.

BRIEF DESCRIPTION OF THE DRAWINGS

The disclosure will be readily understood by the following detailed description in conjunction with the accompanying drawings.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Rather than purchasing and maintaining a large, private bank of server computers, many large-scale computer resource users now outsource their server computing needs by leasing space, e.g., computer processing and storage resources, on a cloud computing platform. Several vendors have built large, distributed server computer platforms, also known as cloud computing services, in physical facilities and have developed related software architectures that allow customers to use multiple individual server computers, or portions of one or more server computers on the distributed server computer platforms, to host the customer's business software and storage operations. For example, Microsoft Corporation offers a distributed server computer platform called Azure® that provides remote and distributed computing resources to its customers. Similarly, Amazon.com, Inc. offers a similar distributed server computer platform for customer leasing called Amazon Web Services® (AWS®). Azure®, AWS®, and similar products, offer various levels and types of leased computer resources depending upon a customer's need. Many of the server computers provided in these cloud platforms are extremely powerful and may further provide massive amounts of data storage.

In some instances, a customer may not need the resources of an entire server computer for certain functionality or storage. In such instances, rather than allowing excess processing power or storage on a server computer go unused, the cloud platform will allocate portions of the computing and/or storage resources on a particular server computer to multiple customers. The customer's applications and data are maintained separately and securely through a variety of software and physical architecture walls. For example, multiple "virtual machines" may be instantiated on a single server, where each virtual machine acts like a separate computer running a separate operating system and separate computer applications specific to the configurations and needs of the customer. Similarly, data storage space on a server may be partitioned between customers via software controls or "physical" partitioning or allocation of data sectors on storage drives.

Regardless of whether a customer leases multiple server computers in their entirety or portions of server computers, or both, the customer is allocated a server computer environment that is separate from and inaccessible to any other customers of the cloud computing platform service. In actuality, the customer may not have any knowledge of whether it is sharing physical computing resources with other customers, or even where the allocated server computer resources are physically located, or if they are even in the same location or distributed geographically. However, the server computer environment allocated to a particular customer is logically separated from server computer environments of other customers. The cloud computing platform providers have developed sophisticated software and hardware architectures to implement seamless access for customers while maintaining at least logical separation of computing resources. As part of the service, the cloud computing platform providers provide a management interface for customers to set up, manage, operate, and test their respective server computer environments.

Figure 1:
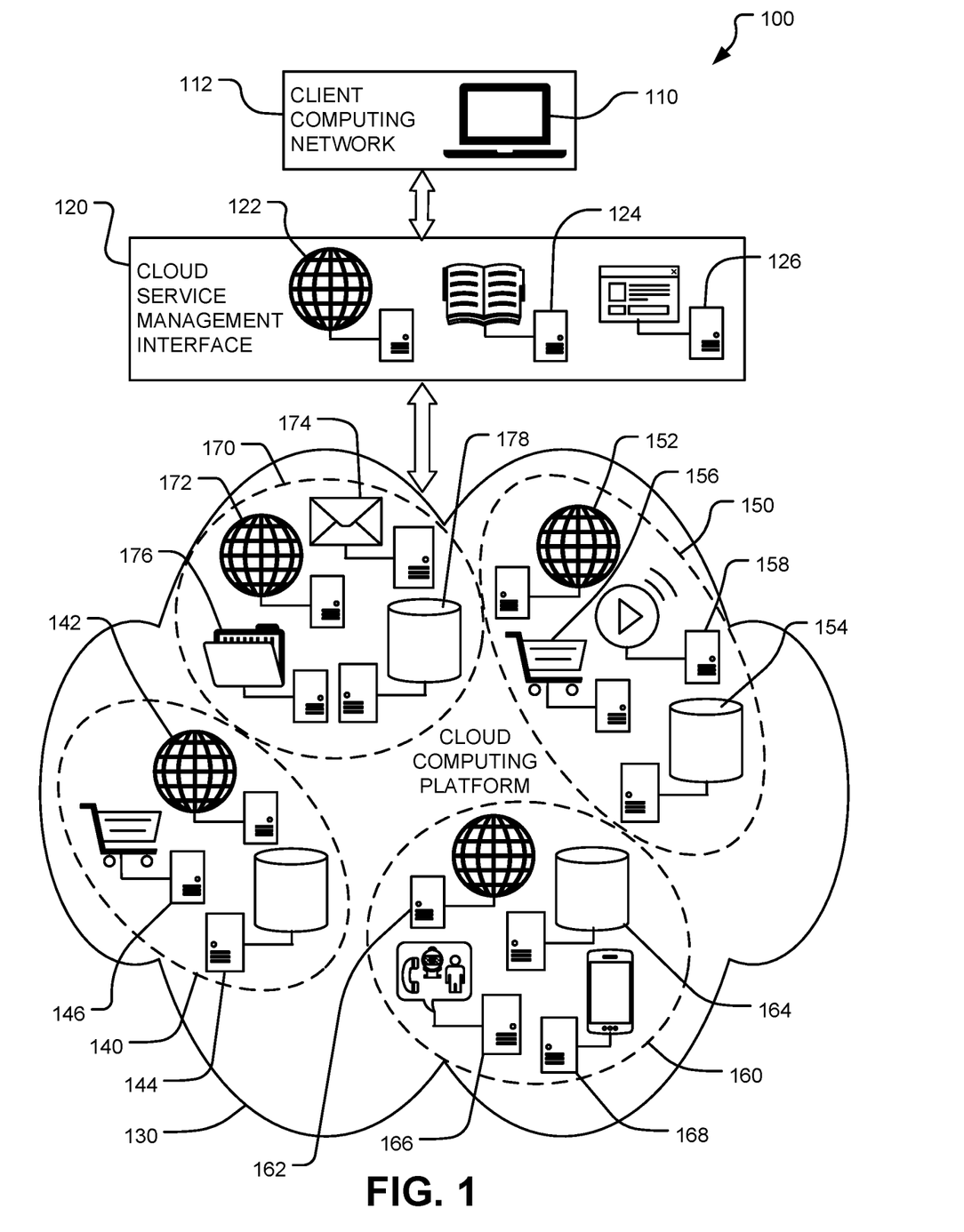
FIG. 1 presents a schematic illustration of a cloud computing platform environment including multiple server resource boundaries related to different customers.

An example implementation of a cloud computing system 100 is depicted in FIG. 1. A customer of the cloud computing service accesses the cloud computing service (e.g., Azure or AWS) through a client computer 110, e.g., a desktop personal computer or a laptop computer, connected to a client computing network 112, e.g., a local area network at the customer's place of business or potentially any network that the client computer 110 can access. The client computing network 112 may be connected to a public network, e.g., the Internet, to allow access by the client computer 110 to the cloud computing service.

The client computer 110 may initially connect to a cloud service management interface 120 provided by the cloud computing service. The cloud service management interface 120 is typically composed of a collection of services operating on one or more server computers. For example, the cloud service management interface 120 may include a web server 122 for providing interactive communication interfaces with the client computer 110 over the Internet to provide a number of services to a customer. For example, the web server 122 may communicate with a directory server 124 to identify computing resources allocated to the customer and thereby connect the client computer 110 to the licensed environment of the cloud computing service. As another example, the cloud service management interface 120 may host an application server 126 that provides a number of software programs and tools for the benefit of the customer. For example, the application server 126 may provide software programs for configuring and building out the licensed environment as well as testing the functionality and reliability of the licensed environment once built.

As noted, the cloud service management interface 120 may act as the gateway to the cloud computing platform 130 for the client computer 110 to access its customer allocated resources on the cloud computing platform 130. The customer licensed resources may be collected in a server computer environment specific to each customer. As discussed above, the computing resources allocated to a specific customer may be discrete or shared, or both, and may be geographically collocated or distributed. Therefore, the server computer environments for each customer are considered "logical" or "virtual" and implemented by software constraints within the cloud computing platform 130.

As shown in FIG. 1, a first customer server computer environment 140 includes several services. In this example, the customer may be an e-commerce business (e.g., Amazon.com® or eBay®) providing a catalog of products for purchase by consumers. Therefore, the first customer server computer environment 140 may include a web server 142 to provide a consumer interface and present products for sale to consumers. The web server 142 may interact with a database server 144 that stores information related to the products for sale, which may include images, specifications, prices, reviews, etc., that are collected, synthesized, and presented on web pages by the web server 142. The web server 142 may also interact with an e-commerce server 146 that provides sales services to a consumer that chooses to purchase a product. The e-commerce server 146 may process customer payments, collect and distribute taxes, and provide shipping services.

A second example customer server computer environment 150 depicted in FIG. 1 may be a streaming media service (e.g., Netflix®, Hulu®, Spotify®). The second customer server computer environment 150 may include a web server 142 to provide a consumer interface and present music (songs) or video titles for purchase, rental, or distribution (e.g., based upon a monthly subscription fee) to consumers. The web server 152 may interact with a database server 154 that stores all information related to the music or videos available for streaming, which may include images, synopses, artist or cast and crew information, reviews, rental fees, etc., that are collected, synthesized, and presented on web pages by the web server 152 The web server 152 may also interact with an e-commerce server 156 that provides sales services to a consumer that chooses to stream or purchase an audio or video or register for a subscription service. The e-commerce server 156 may process customer payments, collect and distribute taxes, and provide shipping services if necessary. Once an audio or video title is selected for streaming and any fees have been paid, the second customer server computer environment 150 may also include a streaming media server 158 that stores the inventory of videos (or interacts with a separate media database server to request an audio or video for streaming or download) and is configured to stream or download the selected media to a consumer device for consumption.

A third example customer server computer environment 160 depicted in FIG. 1 may be a communication service (e.g., internet service or wireless telephone). The third customer server computer environment 160 may include a web server 162 to provide a consumer interface and present service plans or account information to consumers. The web server 162 may interact with a database server 164 that stores all information related to the service plans available for subscription, which may include descriptions and fees, etc., as well as account information for subscribers. This information may be collected, synthesized, and presented on web pages by the web server 162. The third customer server computer environment 160 may further include a real-time communication server 166 (e.g., an internet service provider (ISP) or a virtual central office) that processes the data traffic or telephone call and directs it to the identified destination. The third customer server computer environment 160 may also include a mobile information server 168, which may provide real-time access to business services (e.g., e-mail, calendars, text services) by mobile devices.

A fourth example customer server computer environment 170 depicted in FIG. 1 may be a business enterprise service providing cloud-based services to any size business. The fourth customer server computer environment 170 may include a web server 172 to provide an external presence (e.g., a marketing website) to consumers and potentially an internal employee resource interface. The fourth customer server computer environment 170 may also include a mail server 174 that handles electronic mail, contacts, calendars, tasks, and other standard business enterprise communication and productivity services for employees. The fourth customer server computer environment 170 may additionally include a file server 176, which acts as a cloud repository for employee documents, work product, and other files. The fourth customer server computer environment 170 may further include a database server 178 that stores and manages large volumes of data, e.g., collected for marketing or sales, collected for financial or scientific analysis, or for myriad other business purposes.

As indicated in the cloud computing platform 130, each of the customer server computer environments 140, 150, 160, 170 is logically (and possibly physically) separate from the others. A client computer 110 will only be provided access by the cloud service management interface 120 to those resources on the cloud computing platform 130 leased by the customer and, if the server computer resource is a shared resource, the client computer 110 will only have access to those portions or partitions of the shared server computer resource allocated to the respective customer server computer environments 140, 150, 160, 170. For example, an employee on a client computer 110 seeking access to its business enterprise resources on the cloud computing platform 130 would be required to provide access credentials (e.g., a username and password enterprise login) to access the service on the fourth customer server computer environment 170. Administrators for any of the customer server computer environments 140, 150, 160, 170 would be required to present separate login credentials through the cloud service management interface 120 to configure and manage any application resources implemented within a particular server computer environment 140, 150, 160, 170.

While server computer systems are typically equipped with Error Correction Code (ECC) memory, as indicated above, it is important for computer system administrators to test the server computer environments and configure the server computers and software implemented within the server computer environments to minimize instances of such errors. As noted, uncorrectable failures can be catastrophic and lead to unplanned downtime. If the number of errors exceeds a configurable threshold for the same memory page within a configurable time interval, the hardware architecture may attempt to take the memory page offline before a serious failure occurs. While Predictive Failure Analysis (PFA) for ECC memory can automatically correct certain types of memory errors, if the server computer environment is configured sub-optimally, the corrective measures undertaken by PFA or similar automatic systems may be overwhelmed. However, it is difficult to simulate the characteristics of the behavior of an application service running at scale (e.g., with a full user load) on a server computer outside a production environment. The transient nature of cloud platforms can exacerbate this difficulty. Architecting a service within a server computer environment to expect failure is a core approach to creating a robust, modern service.

"Chaos engineering" is the practice of subjecting software applications and services running on server computer to real-world stresses and failures such as network latency, test loads, unexpected storage outages, expiring secrets, full datacenter outages, etc., to build and validate resilience to unreliable conditions and missing dependencies. Complex computer systems are inherently chaotic, with multiple applications, services, and daemons (e.g., background applications) constantly running which, in combination, can create errors in data that negatively impact the operational efficiency of the server computer. Chaos engineering methodologies help software developers, through experimentation and intentional disruption activities (e.g., real or simulated faults in a controlled manner), discover hard-to-find problems and attain consistent reliability of server computer platforms by hardening services against failures in execution of such services. Chaos engineering embraces the uncertainty of the production environment and strives to anticipate rare, unpredictable, and disruptive outcomes to plan mitigation operations and minimize any potential impact on customers or users.

A common way to introduce chaos for server computer testing purposes is to deliberately inject "faults" that cause computer system components to fail. The goal is to observe, monitor, respond to, and improve reliability of the server computer system under adverse circumstances. For example, taking "dependencies" offline (e.g., stopping application program interfaces (API), shutting down virtual machines (VMs), restricting access (e.g., implementing firewall rules, changing connection strings), or forcing failover (e.g., database level, Front Door), are common and useful ways to validate that a computer application or service can handle faults within operational limits or specifications.

Figure 2:
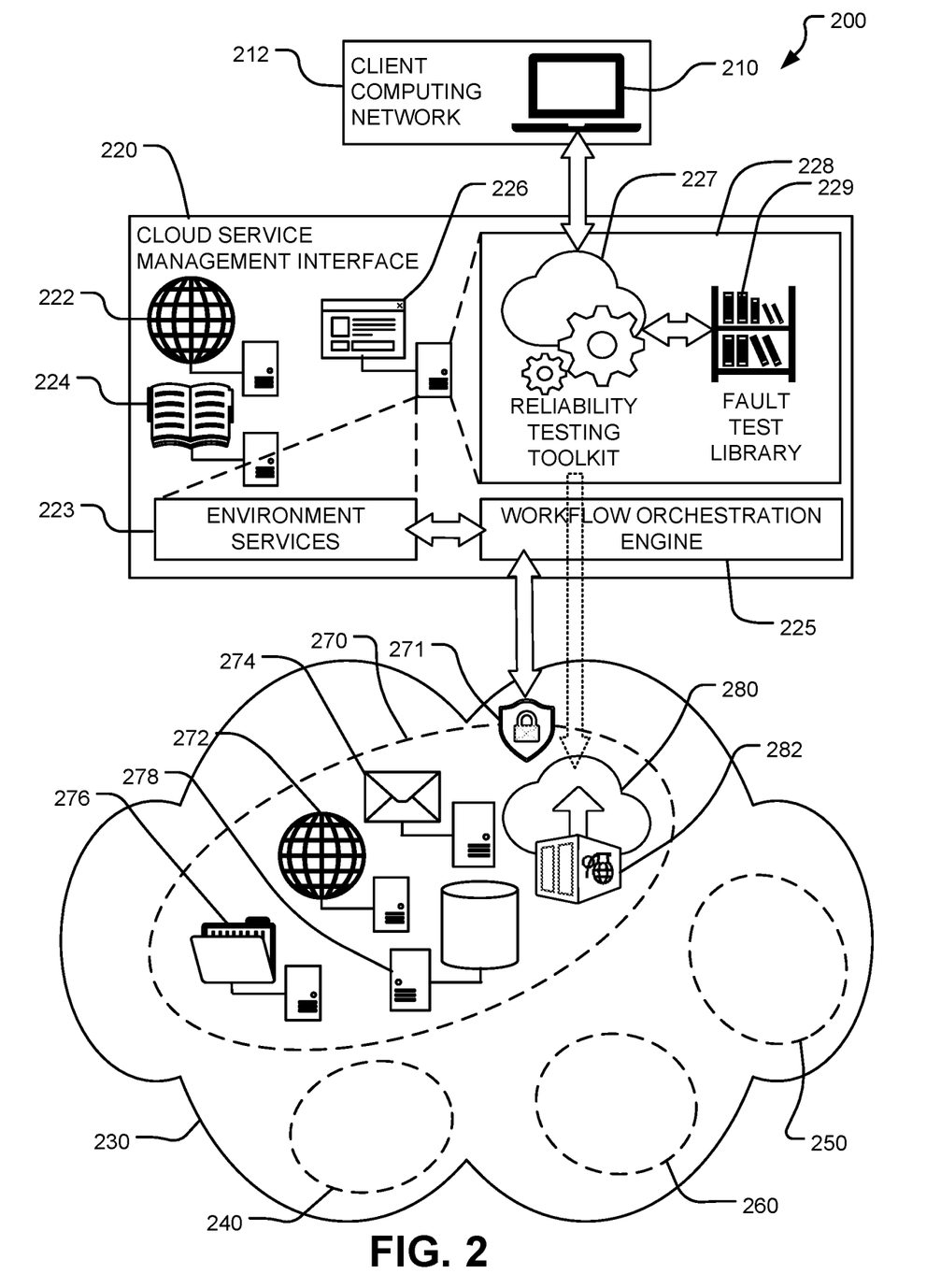
FIG. 2 presents a schematic illustration of a cloud computing platform environment providing customer resources for reliability testing within a server resource boundary utilizing ephemeral containers for fault injection.

An example implementation for fault injection is depicted in the cloud computing system 200 of FIG. 2, which provides a more detailed representation of chaos engineering and fault injection than presented in FIG. 1. As before, the cloud computing system 200 includes a client computer 210, e.g., a desktop personal computer or a laptop computer, connected to a client computing network 212, e.g., a local area network at the customer's place of business or potentially any network that the client computer 210 can access. The client computing network 212 may be connected to a public network, e.g., the Internet, to allow access by the client computer 210 to the cloud computing service.

The client computer 210 may initially connect to a cloud service management interface 220 provided by the cloud computing service. As previously discussed, the cloud service management interface 220 may be composed of a collection of services operating on one or more server computers. Again, the cloud service management interface 220 may include a web server 222 for providing interactive communication interfaces with the client computer 210 over the Internet to provide a number of services to a customer. For example, the web server 222 may communicate with a directory server 124 to identify computing resources allocated to the customer and thereby connect the client computer 210 to the licensed server computer environment.

As before, the cloud service management interface 220 may also host an application server 226 that provides a number of software programs and tools for the benefit of the customer. For example, the application server 226 may provide software programs for configuring and building out the licensed environment as well as testing the functionality and reliability of the built environment. As depicted in FIG. 2, the application server 226 provides an environment services module 223 that provides a customer connected through the client computer 210 access to a variety of functional services for building out, monitoring, and managing a server computer environment. For example, the environment services module 223 may allow remote shutdown of server computers or virtual machines; remote changes to network security policies of applications on a server computer (e.g., restrict traffic to a port running on a server computer); implementation of rules that use APIs to control applications on virtual machines; customer configuration of security and usage rights users of applications running on the server computers; and other actions. The application server 226 may also provide a workflow orchestration engine 225 that is an application program configured to manage communication traffic between a customer's directives within applications available on the cloud service management interface 220, e.g., from the environment services module 223 and the customer's server computer environment. The workflow orchestration engine 225 may also manage the timing of actions requested among any applications instantiated on the application server 226, monitor the status and operational parameters of the server computers in the customer server computer environment, and provide reporting and logs regarding the same.

Additionally, the application server 226 may include a toolkit module 228 that provides numerous tools to customer administrators for testing and repairing issues that may arise with any of the server computers within the customer server computer environment. One tool in the toolkit module 228 may be a reliability testing toolkit 227 that provides for the design, configuration, and deployment of fault applications to test the reliability of server computers within the customer server computer environment. A library 229 of fault tests may be provided in conjunction with the reliability testing toolkit 227. The fault test library 229 may include configurable tests for individual server computers and for the server computer environment such as CPU pressure, network latency, blocked resource access, and infrastructure outages.

As noted, the cloud service management interface 220 may act as the gateway to the cloud computing platform 230 for the client computer 210 to access its customer allocated resources on the cloud computing platform 230. In some implementations, the workflow orchestration engine 225 may provide these gateway services. As described above, the cloud computing platform 230 may host many customer server computer environments 240, 250, 260, 270 that are logically (and possibly physically) separate from the others. In the example of FIG. 2, only the business enterprise service implemented in the fourth example customer server computer environment 270 is depicted for brevity. As before, the fourth customer server computer environment 270 may include a web server 272, a mail server 274, a file server 276, and a database server 278. In addition, access to the customer server computer environment 270 may be controlled by a security boundary 271 coextensive with the resources within customer server computer environment 270. The customer administrator may provide security credentials to users and to applications or services operating within the customer server computer environment 270 to allow necessary and appropriate, but limited access to the customer server computer environment 270 and the resources therein.

A customer client computer 210 is only provided access by the cloud service management interface 220 to those resources on the cloud computing platform 230 leased by the customer and, if the server computer resource is a shared resource, the client computer 210 only has access to those portions or partitions of the shared server computer resource allocated to the respective customer server computer environments 240, 250, 260, 270. For example, an employee on a client computer 210 seeking access to its business enterprise resources on the cloud computing platform 230 would be required to provide access credentials (e.g., a username and password enterprise login) to access the service on the fourth customer server computer environment 270. An administrator for the fourth customer server computer environment 270 would be required to present separate login credentials through the cloud service management interface 220 to configure and manage any application resources implemented within the fourth customer server computer environment 270.

Currently, when a customer client computer 210 provisions a chaos experiment for the customer computer server environment 270, specialized perpetual agent injection programs are installed on one or more of the server computers (e.g., servers 272, 274, 276, 278) in the customer computer server environment 270. The perpetual agent injection programs are issued administrative access credentials which allow the perpetual agent injection program to communicate with system resources and implement the fault generating experiments (for example, to communicate with hardware processor buffers and inject failure data therein). The perpetual agent injection programs are presently designed as continuous state machines and run constantly and uninterrupted in the background (e.g., as a daemon application) on the server computers in the customer computer server environment 270 in order to accept and implement new test requests or run multiple fault experiments sequentially. Unless an administrator performs a search for programs running on a particular processor, the administrator may not know the perpetual agent injection program is operating. The continuous presence of the perpetual agent injection program, even if not continuously managing implementation of a test, may be considered a security liability, for example, if the perpetual agent injection program is accessed by a third party and the administrative access credentials copied for malicious uses. Alternatively, a malicious actor could hypothetically take control of the perpetual agent injection program to maintain injection faults into the system outside of an administrator test or inject faults designed by the malicious actor, without customer administrator knowledge, and thereby reduce the reliability and efficiency of the customer computer server environment 270. In addition, the continuous presence of the perpetual agent injection program consumes power and processor resources, and thereby reduces efficiency of server computers within the customer computer server environment 270.

In contrast, in the present implementation, the reliability testing toolkit 227 further provides a temporary, ephemeral, i.e., self-terminating, fault injector programs 280 for short-lived deployment within the server computer environment 270. The ephemeral fault injector programs 280 are instantiated when a customer administrator initiates a test request. Each ephemeral fault injector program 280 is independent and operates separately as compared to monolithic fault providers that run continuously using the operating system of customer server computers or virtual machine services. Unlike other fault injector designs, the ephemeral fault injector programs 280 disclosed herein do not run on agent applications (e.g., background daemons) on the server computers within the server computer environment 270. Rather, the ephemeral fault injector programs 280 are configured as state machines that instantiate and self-execute the provisioned fault experiment upon insertion within the server computer environment 270, and self-terminate upon reaching a defined state, for example, conclusion of the task or test or upon monitoring achievement of a certain environmental condition (e.g., after a set number of cycles or period of time, upon the triggering of a certain error, reduction in processor performance to a threshold level). The ephemeral fault injector programs 280 may be deployed on-demand, or randomly to inject failures into distributed systems within the server computer environment 270 to evaluate the resiliency of the hardware, systems, services, and applications, including on different application layers, therein. The ephemeral fault injector programs 280 can also be used with continuous integration/continuous delivery (CI/CD), e.g., during software upgrades, as well. The client administrator performing a software upgrade may instantiate ephemeral fault injector programs 280 to run fault experiments through the CI/CD pipeline.

A number of benefits may be realized by using ephemeral fault injector programs 280. As noted, the ephemeral fault injector programs 280 instantiate independently, either on-demand or randomly, within the customer security boundary 271 and self-terminate once fault injection is complete rather than perpetually running like a daemon application (e.g., a hidden background process). While the ephemeral fault injector programs 280 are provisioned with administrative or security credentials to access necessary systems within the customer server computer environment 270, these security credentials disappear when the ephemeral fault injector program 280 self-terminates. Because there is no perpetual agent injection program running as a daemon application and maintaining security credential information, the ephemeral fault injector programs 280 are immune to external access or control and system security within the customer security boundary 271 is improved. Further, because the ephemeral fault injector program 280 is not persistent, it is much more resource efficient and energy efficient, and therefore more cost efficient than perpetual agent injection programs.

In another aspect, the deployment scale of the ephemeral fault injector programs 280 can be much larger because implementation is not tied to a single agent program running on a server computer. Ephemeral fault injector programs 280 can be deployed to create separate faults for any number of services (e.g., virtual machines, databases) running on one or more server computers within the server computer environment 270. Each ephemeral fault injector program 280 can launch a different test or a common test with different parameters. For example, a customer administrator can pick and choose between different fault tests; change test parameters such as duration of test, frequency of error insertion, type of error, etc., to model different scenarios; define particular server computer targets within the server computer environment 270; or even assign ephemeral fault injector program 280 to be inserted at random on different computer servers or services. As another example, some customers run server computers in multiple zones/geographies (e.g., to provide faster data access service to their own customers, for example, for video streaming) and may use the ephemeral fault injector program 280 to effect only certain zones.

The ephemeral fault injector program 280 may also be deployed in a software container 282 that is likewise self-terminating. A container 282 is a package of software (e.g., Docker, Kubernetes) that contains all of the necessary elements to run the contained program, e.g., the ephemeral fault injector program 280, in any computing environment. Containers encapsulate an application as a single executable package of software that bundles application code together with all of the related configuration files, libraries, and dependencies required for it to run. Containerized applications are "isolated" in that they do not bundle in a copy of the operating system. In this manner, an ephemeral fault injector program 280 can be designed and configured with desired parameters and deployed to any cloud computing platform (e.g., Azure, AWS) as long as the selected container 282 is configured with appropriate application protocol interfaces for the fault injector program 280, and is thus platform agnostic. The container 282 may only operate when initiated by the user and, similar to the ephemeral fault injector program 280 may be configured to self-terminate upon termination of the fault injector program 280. Thus, the container 282 does not operate and consume processing resources continuously like a daemon application. The container 282 may also be presented more visibly, e.g., as a foreground process, rather than a background process, so the administrator running the chaos experiment can easily confirm when a test is completed.

Figure 3:
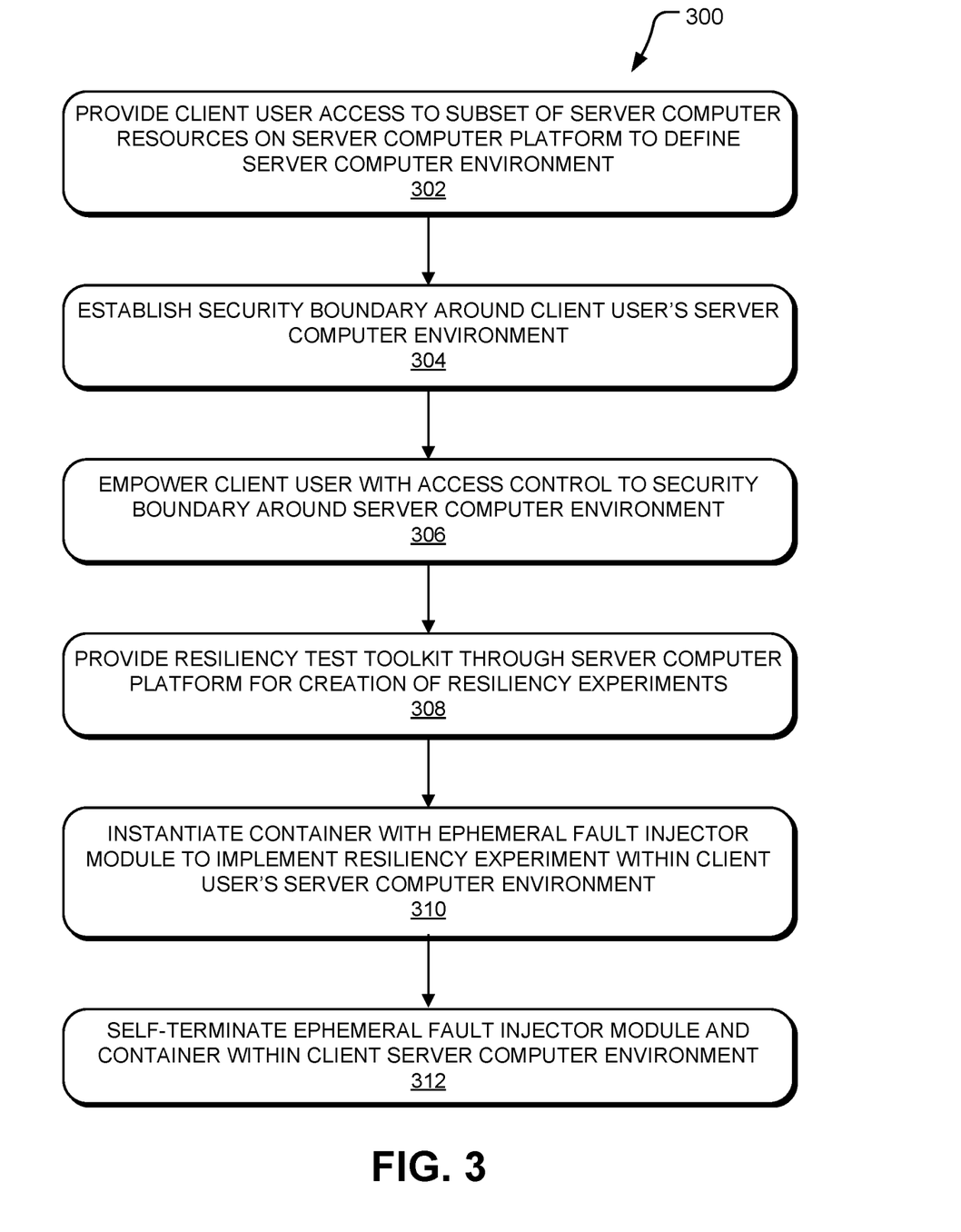
FIG. 3 presents a flow diagram of a process for fault injection within a server resource boundary using ephemeral containers.

FIG. 3 depicts an example flow diagram of a method 300 for implementing an ephemeral, self-terminating fault injector module within a server computer environment. In a providing operation 302, a client user is provided access to subset of server computer resources on server computer platform to define the boundaries of and resources allocated to the client user's server computer environment. In an establishing operation 304, a security boundary may be established around the customer's server computer environment. In an empowering operation 306, the client user is empowered to control access through the security boundary around the client user's server computer environment. In a further providing operation 308, a resiliency test toolkit is provided to the client user through server computer platform for creation of resiliency experiments. In an instantiating operation 310, a container including an ephemeral fault injector module is instantiated to implement a resiliency experiment within client user's server computer environment. Then, in a terminating operation 312, ephemeral fault injector module (and corresponding container) self-terminate within client server computer environment and cease all operation.

As described herein, the process of FIG. 3 does not require a perpetual agent test program to be installed or deployed on each server computer or service on which faults need to be injected. The ephemeral fault injector module is agentless, i.e., it is self-contained for independent deployment on any server computer or service. The temporary and agentless aspects of the ephemeral fault injector modules aid in scalability of testing, even to exponential levels. For example, millions of ephemeral fault injector modules could be triggered to inject faults in heterogeneous targets. The ephemeral fault injector modules have a very low resource footprint, e.g., hardware processor and memory usage are low using minimum required threads, and they are very short-lived so there is no perpetual resource draw.

The ephemeral fault injector modules may further be understood as highly flexible temporary plug-ins. A user can create new, custom, ephemeral fault injector modules by inheriting abstract core fault injector images or components such as fault telemetry, health check, and load test integrator components from a base fault injector model and also through adjustment of parameters. The ephemeral fault injector modules may also be created in a polyglot manner, using any programming language and for any platform, but rendered agnostic for deployment by placing them in a container specific to the platform for delivery and instantiation. In contrast, agent-based fault injectors are specifically written for installation on each different platform.

Figure 4:
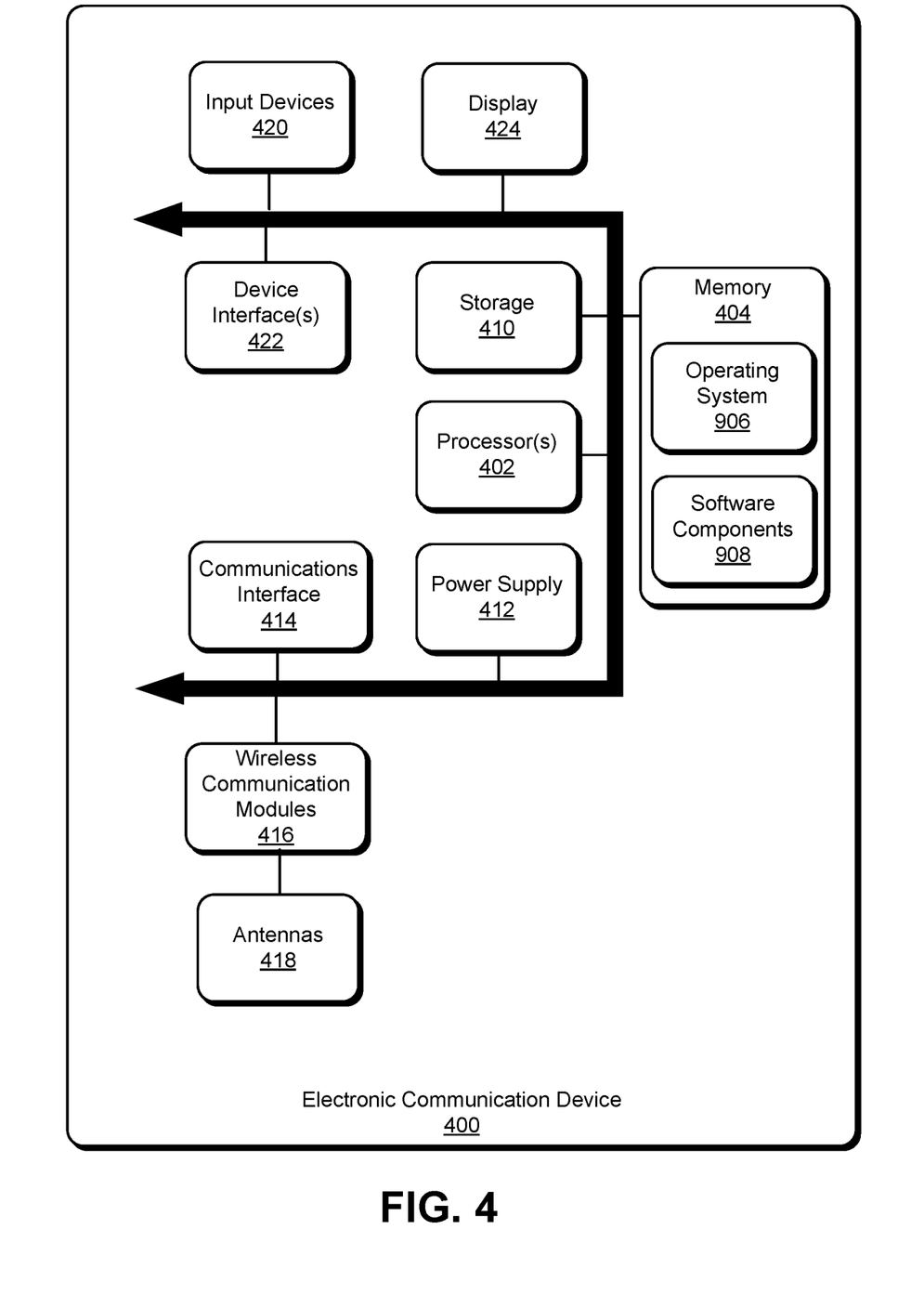
FIG. 4 presents a schematic illustration of an example of a computing system representative of server computers in a cloud computing platform that may be subject to reliability testing using ephemeral containers.

FIG. 4 illustrates an example computer device 400 for implementing the features and operations of the described technology within and in conjunction with a cloud computing platform environment. The device 400 may embody any network-connected and/or network-capable device and may be a client device, such as a laptop computer, a mobile telephone device, a desktop computer, or a tablet computer, which may be used as a client device interacting with the user's server computer environment; a server/cloud computer device, of which several may be included in the user's server computer environment; an internet-of-things device, e.g., a television, a wireless speaker, a thermostat, a doorbell/security camera, any of which may be a part of the user's local area network and potentially interact with the user's server computer environment; an electronic accessory, e.g., a game controller, a smart watch, which may also be a part of the user's local area network and potentially interact with the user's server computer environment; or another electronic device with computer processing and memory capabilities and wired or wireless communication capabilities.

The computer device 400 may include one or more processor(s) 402 and a memory 404 and one or more storage devices 410. The memory 404 generally includes both volatile memory (e.g., RAM) and nonvolatile memory (e.g., flash memory). An operating system 406 is instantiated in the memory 404 and is executed by the processor(s) 402. The computer device 400 includes a power supply 412, which is powered by one or more batteries or other power storage sources and provides power to other components of the computer device 400. The power supply 412 may also be connected to an external power source that overrides or recharges the built-in batteries or other power sources.

The storage devices 410 of the computer device 400 may include a variety of tangible processor-readable storage media. Tangible processor-readable storage can be embodied by any available media that can be accessed by the computer device 400 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computer device 400.

In an example computer device 400, as shown in FIG. 4, one or more software components 408, such as firmware, software applications, instruction modules, communications interface drivers, peripheral drivers, etc., are stored in the memory 404 and/or on the storage device 410, may be instantiated by the operating system 406 and executed by processor(s) 402. Example software applications may include electronic mail programs, scheduling programs, personal information management programs, word processing programs, spreadsheet programs, Internet browser programs, music file management programs, and photograph and video file management programs. The storage device 410 may include one or more tangible storage media devices and may store data used by application software, including locally and globally unique identifiers, requests, responses, and other data and be local to the computer device 400 or may be remote and communicatively connected to the computer device 400.

Various software components 408 described herein may be executable by the one or more processors 402, which may include logic machines configured to execute hardware or firmware instructions. For example, the processors 402 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. In the present disclosure, such applications and programs may include a reliability testing toolkit for designing reliability experiments in the user's server computer environment. The reliability testing toolkit application may include a library of different test modules for selection and configuration by the user. Such applications may also include container objects for deployment or "injection" of an ephemeral, self-terminating fault routine for testing the reliability of the user's server computer environment.

Aspects of processors 402 and memory 404 may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, application program interface (API), function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. It may be appreciated that a "service," as used herein, is an application program executable across one or multiple user sessions. A service may be available to one or more system components, programs, and/or other services. In some implementations, a service may run on one or more server computing devices.

The computer device 400 may include a communications interface 414 (e.g., a network adapter) that manages one or more wireless communication modules 416 for establishing connections over a wide-area network (WAN) or local-area network (LAN), for example, ethernet ports, wireless transmitters, wireless receivers, or transceivers (e.g., a combined transmitter and receiver), which may be connected to one or more antenna(s) 418 to provide network connectivity (e.g., to mobile phone networks such as LTE and 5G, Wi-Fi®, GPS, Bluetooth®, Near Field Sensing) or to one or more other devices on a network (e.g., mobile devices, desktop computers, laptop computers, or servers). In some embodiments, multiple wireless communication modules 416 and antennas 418 are employed to communicate incoming and outgoing radio frequency carrier signals on various different frequency bandwidths and utilize different communication protocols. It should be appreciated that the network connections shown are examples and that other computing devices and structures and protocols for establishing a communications link between the computer device 400 and other devices may be used.

The communications interface 414 may provide for transmission of intangible processor-readable communication signals. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include signals traveling through wired media such as a wired network or direct-wired connection, and wireless media such as acoustic, radio frequency (RF), infrared, and other wireless media.

The computer device 400 may include one or more input devices 420 such that a user may enter commands and information (e.g., a touch screen, a keyboard, a mouse, a microphone). These and other input devices may be coupled to other internal components or modules by one or more device interfaces 422, such as a serial port interface, parallel port, or universal serial bus (USB). The computer device 400 may further include a display device 424, such as an LCD display, and LED display, or a touch screen display.

An example method for testing resiliency of a server computer environment includes the following operations. Access to a subset of server computer resources is provided to a client user within a distributed server computer platform to form the server computer environment. Upon receipt of client user initiation, an ephemeral fault injector program is instantiated to implement a resiliency experiment within the server computer environment. The ephemeral fault injector program is configured to self-terminate within the server computer environment upon reaching a defined state of the resiliency experiment.

In another example method, a container is instantiated within the server computer environment and the container instantiates the ephemeral fault injector program within the server computer environment. The container is configured to self-terminate upon the ephemeral fault injector program reaching the defined state of the resiliency experiment.

In another example method, a security boundary is established around the server computer environment. Credentials are provided for empowering a client user to control access to the server computer environment within the security boundary.

In another example method, instantiation of the ephemeral fault injector program within the server computer environment requires authorization for access to the server computer environment within a security boundary around the server computer environment.

In another example method, a reliability testing toolkit is provided within the distributed server computer platform to the client user for creation of the resiliency experiment implemented by the ephemeral fault injector program.

In another example method, the ephemeral fault injector program operates independently upon instantiation and is immune to external access and control.

In another example method, the defined state comprises one or more of the following: conclusion of the resiliency experiment; achievement of an environmental condition; expiration of a cycle count or period of time, trigger of a particular error; or reduction in processor performance to a threshold level.

In another example implementation, one or more tangible processor-readable storage media are embodied with instructions for executing a process on a computer device to test resiliency of a server computer environment. The process includes providing access to a subset of server computer resources to a client user within a distributed server computer platform to form the server computer environment. Upon receipt of client user initiation, an ephemeral fault injector program is instantiated to implement a resiliency experiment within the server computer environment. The ephemeral fault injector program is configured to self-terminate within the server computer environment upon reaching a defined state of the resiliency experiment.

In another example, the tangible processor-readable storage media further embody instructions for instantiating a container within the server computer environment. The container instantiates the ephemeral fault injector program within the server computer environment. The container is configured to self-terminate upon the ephemeral fault injector program reaching the defined state of the resiliency experiment.

In another example, the tangible processor-readable storage media further embody instructions for establishing a security boundary around the server computer environment. Credentials for empowering a client user to control access to the server computer environment within the security boundary are provided.

In another example, the tangible processor-readable storage media further embody instructions for requiring authorization for access to the server computer environment within a security boundary around the server computer environment for instantiation of the ephemeral fault injector program within the server computer environment.

In another example, the tangible processor-readable storage media further embody instructions for providing a reliability testing toolkit within the distributed server computer platform to the client user for creation of the resiliency experiment implemented by the ephemeral fault injector program.

In another example, the tangible processor-readable storage media further embody instructions for independent operation of the ephemeral fault injector program upon instantiation such that it is immune to external access and control.

In another example, the tangible processor-readable storage media further embody instructions providing for the defined state to include one or more of the following: conclusion of the resiliency experiment; achievement of an environmental condition; expiration of a cycle count or period of time, trigger of a particular error; or reduction in processor performance to a threshold level.

In another example implementation, a system for testing resiliency of a server computer environment includes a subset of server computer resources with one or more hardware computing processors is allocated to a client user within a distributed server computer platform to form the server computer environment. A memory storage device is configured to receive and store instructions for directing the one or more hardware computing processors to conduct processing operations. A communication interface is configured to receive instructions to be stored temporarily in the memory storage device for directing the one or more hardware computing processors to instantiate an ephemeral fault injector program to implement a resiliency experiment within the server computer environment. The ephemeral fault injector program is configured to self-terminate within the server computer environment upon reaching a defined state of the resiliency experiment.

In another example system, the one or more hardware computing processors are further directed to instantiate a container within the server computer environment. The container instantiates the ephemeral fault injector program within the server computer environment. The container is configured to self-terminate upon the ephemeral fault injector program reaching the defined state of the resiliency experiment.

In another example system, the one or more hardware computing processors are further directed to establish a security boundary around the server computer environment. Credentials are provided to empower a client user to control access to the server computer environment within the security boundary.

In another example system, authorization for access to the server computer environment within a security boundary around the server computer environment is required for instantiation of the ephemeral fault injector program within the server computer environment.

In another example system, the one or more hardware computing processors are further directed to provide a reliability testing toolkit within the distributed server computer platform to the client user for creation of the resiliency experiment implemented by the ephemeral fault injector program.

In another example system, the ephemeral fault injector program operates independently upon instantiation and is immune to external access and control.

In another example system, the defined state includes one or more of the following: conclusion of the resiliency experiment; achievement of an environmental condition; expiration of a cycle count or period of time, trigger of a particular error; or reduction in processor performance to a threshold level.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language. Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. Moreover, the separation of various system components in the implementations described above should not be understood as requiring such separation in all implementations.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary.

The above specification, examples and data provide a thorough description of the structure and use of example embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for testing resiliency of a server computer environment comprising:
providing access to a subset of server computer resources to a client user within a distributed server computer platform to form the server computer environment; and
upon receipt of input from the client user through a management interface of the distributed server computer platform, instantiating an ephemeral fault injector program to implement a resiliency experiment within the server computer environment, wherein the ephemeral fault injector program is configured to self-terminate within the server computer environment upon reaching a defined state of the resiliency experiment, wherein the ephemeral fault injector program is immune to external access and control.

2. The method of claim 1, further comprising:
instantiating a container within the server computer environment, wherein the container instantiates the ephemeral fault injector program within the server computer environment, and
wherein the container is configured to self-terminate upon the ephemeral fault injector program reaching the defined state of the resiliency experiment.

3. The method of claim 1 further comprising:
establishing a security boundary around the server computer environment; and
providing credentials empowering a client user to control access to the server computer environment within the security boundary.

4. The method of claim 1, wherein instantiation of the ephemeral fault injector program within the server computer environment requires authorization for access to the server computer environment within a security boundary around the server computer environment.

5. The method of claim 1 further comprising providing a reliability testing toolkit within the distributed server computer platform to the client user for creation of the resiliency experiment implemented by the ephemeral fault injector program.

6. The method of claim 1, wherein the ephemeral fault injector program operates independently upon instantiation.

7. The method of claim 1, wherein the defined state comprises one or more of the following: conclusion of the resiliency experiment; achievement of an environmental condition; expiration of a cycle count or period of time, trigger of a particular error; or reduction in processor performance to a threshold level.

8. The method of claim 1, wherein the management interface is external to a security boundary of the server computer environment.

9. One or more tangible processor-readable storage media embodied with instructions for executing a process on a computer device to test resiliency of a server computer environment, the process comprising:
providing access to a subset of server computer resources to a client user within a distributed server computer platform to form the server computer environment; and
upon receipt of input from the client user through a management interface of the distributed server computer platform, instantiating an ephemeral fault injector program to implement a resiliency experiment within the server computer environment, wherein the ephemeral fault injector program is configured to self-terminate within the server computer environment upon reaching a defined state of the resiliency experiment, wherein the ephemeral fault injector program is immune to external access and control.

10. The one or more tangible processor-readable storage media of claim 9, wherein the process further comprises:
instantiating a container within the server computer environment, wherein the container instantiates the ephemeral fault injector program within the server computer environment, and
wherein the container is configured to self-terminate upon the ephemeral fault injector program reaching the defined state of the resiliency experiment.

11. The one or more tangible processor-readable storage media of claim 9, wherein the process further comprises:
establishing a security boundary around the server computer environment; and
providing credentials empowering a client user to control access to the server computer environment within the security boundary.

12. The one or more tangible processor-readable storage media of claim 9, wherein instantiation of the ephemeral fault injector program within the server computer environment requires authorization for access to the server computer environment within a security boundary around the server computer environment.

13. The one or more tangible processor-readable storage media of claim 9, wherein the process further comprises providing a reliability testing toolkit within the distributed server computer platform to the client user for creation of the resiliency experiment implemented by the ephemeral fault injector program.

14. The one or more tangible processor-readable storage media of claim 9, wherein the ephemeral fault injector program operates independently upon instantiation.

15. A system for testing resiliency of a server computer environment, the system comprising:
a subset of server computer resources allocated to a client user within a distributed server computer platform to form the server computer environment with one or more hardware computing processors;
a memory storage device configured to receive and store instructions for directing the one or more hardware computing processors to conduct processing operations; and
a communication interface of the distributed server computer platform, the communication interface being configured to receive input from the client user and, in response to the input, generate instructions executable to cause the one or more hardware computing processors to instantiate an ephemeral fault injector program to implement a resiliency experiment within the server computer environment, wherein the ephemeral fault injector program is immune to external access and control and configured to self-terminate within the server computer environment upon reaching a defined state of the resiliency experiment.

16. The system of claim 15, wherein the one or more hardware computing processors are further directed to:
instantiate a container within the server computer environment, wherein
the container instantiates the ephemeral fault injector program within the server computer environment, and
the container is configured to self-terminate upon the ephemeral fault injector program reaching the defined state of the resiliency experiment.

17. The system of claim 15, wherein the one or more hardware computing processors are further directed to:
establish a security boundary around the server computer environment; and
provide credentials to empower a client user to control access to the server computer environment within the security boundary.

18. The system of claim 15, wherein instantiation of the ephemeral fault injector program within the server computer environment requires authorization for access to the server computer environment within a security boundary around the server computer environment.

19. The system of claim 15, wherein the one or more hardware computing processors are further directed to provide a reliability testing toolkit within the distributed server computer platform to the client user for creation of the resiliency experiment implemented by the ephemeral fault injector program.

20. The system of claim 15, wherein the ephemeral fault injector program operates independently upon instantiation.

21. The system of claim 15, wherein the defined state comprises one or more of the following: conclusion of the resiliency experiment; achievement of an environmental condition; expiration of a cycle count or period of time, trigger of a particular error; or reduction in processor performance to a threshold level.

* * * * *